US011295744B2

(12) United States Patent
Bourgoin

(10) Patent No.: US 11,295,744 B2
(45) Date of Patent: Apr. 5, 2022

(54) VOICE ASSISTANCE DEVICE AND METHOD

(71) Applicant: SAGEMCOM BROADBAND SAS, Rueil Malmaison (FR)

(72) Inventor: Gilles Bourgoin, Rueil Malmaison (FR)

(73) Assignee: SAGEMCOM BROADBAND SAS, Rueil Malmaison (FR)

( * ) Notice: Subject to any disclaimer, the term of this patent is extended or adjusted under 35 U.S.C. 154(b) by 0 days.

(21) Appl. No.: 16/954,411

(22) PCT Filed: Dec. 4, 2018

(86) PCT No.: PCT/EP2018/083477
§ 371 (c)(1),
(2) Date: Jun. 16, 2020

(87) PCT Pub. No.: WO2019/120984
PCT Pub. Date: Jun. 27, 2019

(65) Prior Publication Data
US 2020/0380988 A1 Dec. 3, 2020

(30) Foreign Application Priority Data
Dec. 19, 2017 (FR) ...................................... 1762493

(51) Int. Cl.
*G10L 15/22* (2006.01)
*G10L 15/08* (2006.01)
(Continued)

(52) U.S. Cl.
CPC .............. *G10L 15/22* (2013.01); *G10L 15/08* (2013.01); *H04N 21/42203* (2013.01);
(Continued)

(58) Field of Classification Search
USPC .......................... 704/246, 247, 251, 252, 275
See application file for complete search history.

(56) References Cited

U.S. PATENT DOCUMENTS 9,548,053 B1    1/2017   Basye et al.
9,728,188 B1    8/2017   Rosen et al.
(Continued)

OTHER PUBLICATIONS

International Preliminary Report on Patentability and the Writtrn Opinion of the International Searching Authority as issued in International Patent Application No. PCT/EP2018/083477, dated Jun. 23, 2020.
(Continued)

*Primary Examiner* — Leonard Saint Cyr
(74) *Attorney, Agent, or Firm* — Pillsbury Winthrop Shaw Pittman LLP

(57) ABSTRACT

A voice assistance device includes a microphone picking up and transmitting a first signal to a detection unit; the detection unit routing, in case of detection of the wakeup word in the first signal, the first signal to an analysis unit; the analysis unit processing the first signal and generating an output signal. The detection unit includes a first module detecting the wakeup word in the first signal, a second module detecting the wakeup word in a second signal received from at least one external audio source and a control module routing the first signal to the analysis unit when the wakeup word is detected solely by the first module of the detection unit.

8 Claims, 1 Drawing Sheet

(51) Int. Cl.
*H04N 21/422* (2011.01)
*H04N 21/439* (2011.01)

(52) U.S. Cl.
CPC ... *H04N 21/4394* (2013.01); *G10L 2015/088* (2013.01); *G10L 2015/223* (2013.01)

(56) References Cited

U.S. PATENT DOCUMENTS

| | | | |
|---|---|---|---|
| 10,789,949 B2* | 9/2020 | Carreras | H04M 9/082 |
| 2015/0294666 A1 | 10/2015 | Miyasaka et al. | |
| 2017/0245076 A1* | 8/2017 | Kusano | H04L 65/1059 |
| 2018/0204569 A1* | 7/2018 | Nadkar | G10L 15/22 |
| 2018/0366117 A1* | 12/2018 | Carreras | G10L 25/78 |
| 2019/0043492 A1* | 2/2019 | Lang | G06F 3/165 |

OTHER PUBLICATIONS

International Search Report as issued in International Patent Application No. PCT/EP2018/083477, dated Feb. 12, 2019.

* cited by examiner

VOICE ASSISTANCE DEVICE AND METHOD

CROSS-REFERENCE TO RELATED APPLICATIONS

This application is the U.S. National Stage of PCT/EP2018/083477, filed Dec. 4, 2018, which in turn claims priority to French patent application number 1762493 filed Dec. 19, 2017. The content of these applications are incorporated herein by reference in their entireties.

TECHNICAL FIELD OF THE INVENTION

The technical field of the invention is that of voice assistance. The present invention relates to a voice assistance device and method.

TECHNOLOGICAL BACKGROUND OF THE INVENTION

A voice assistance device, or voice assistant, conventionally works in the following manner: a microphone captures an environment in the form of a signal and transmits this signal to a unit for detecting a wake word. The signal consecutive to the wake word is considered as a request of a user. In the event of detection of the wake word, the detection unit routes the signal originating from the microphone to an analysis unit which processes it in order to interpret the request that it contains and to generate a response signal to said request. The analysis unit then transmits the response signal to a loudspeaker which broadcasts it. The user thus obtains a response to his request.

A drawback of known voice assistants is that they do not differentiate between a signal originating directly from a human user and a signal originating from a recording. If the microphone captures for example a recording originating from a television or radio device and when a journalist pronounces the wake word on air, the voice assistant will interpret what follows as a request and will do its best to respond thereto. Such a malfunction is disagreeable or even detrimental for the user: the voice assistant is going for example to respond to a question that the user has not posed or even to command an object inopportunely.

A known technique for cancelling acoustic echo would make it possible to delete from the signal captured by the microphone of the voice assistant the signal originating from a loud speaker of an external audio source, such as a television or a radio. This technique requires however a complex signal processing module and notably necessitates, to be efficient, knowing with precision the distance between the microphone of the voice assistant and the loud speaker of the external audio source. Apart from its complexity and thus its cost, a drawback of this solution is thus that the microphone of the voice assistant must remain at a fixed distance from the external audio source.

Another known technique of beam forming would make it possible to locate the external audio source and to identify its direction with respect to the microphone in order to ignore any signal originating from this direction. A drawback of this technique is to be completely denied a zone of the space which is however useable: with this technique, a user situated between his television and his voice assistant will be ignored by the voice assistant.

SUMMARY OF THE INVENTION

The invention offers a solution to the aforementioned problems, by proposing a voice assistant making it possible to differentiate a signal originating directly from a human user from a signal originating from a recording of an external audio source, without any constraint on the distance between the voice assistant and the source of the recording or the positioning of the user with respect to the voice assistant and the source of the recording.

A first aspect of the invention relates to a voice assistance device comprising:
  a microphone and
  a unit for detecting a wake word,
  the microphone being configured to capture a sound environment in the form of a first signal and to transmit the first signal to the detection unit; the detection unit being configured to route, in the event of detection of the wake word in the first signal, said first signal to an analysis unit; said analysis unit being configured to process the first signal and to generate an output signal; the detection unit comprising:
    a first module configured to receive from the microphone the first signal and to detect the wake word in said first signal,
    a second module configured to receive from at least one external audio source a second signal and to detect the wake word in said second signal, and
    a control module configured to route the first signal to the analysis unit when the wake word is detected only by the first module of the detection unit.

A second aspect of the invention relates to a voice assistance method comprising the following steps:
  a microphone captures a sound environment in the form of a first signal and transmits the first signal to a detection unit comprising:
    a first module for detecting a wake word in the first signal,
    a second module for detecting the wake word in a second signal transmitted by at least one external audio source, and
    a control module;
  the control module routes the first signal to an analysis unit when the wake word is detected only by the first module of the detection unit;
  the analysis unit processes the first signal transmitted by the control module and generates an output signal.

Thanks to the invention, the detection unit detects the wake word both in the first signal from the microphone via the first module and in the second signal from at least one external audio source via the second module. In the event of detection of the wake word, the detection unit routes, via its control module, the first signal to the analysis unit as a function of the activity of the first and second detection modules:
  if the wake word has been detected only by the first module, the control module routes the first signal to the analysis unit;
  if the wake word has been detected only by the second module or both by the first and second modules, the control module does not route the first signal to the analysis unit.

The detection unit differentiates the first signal from the second signal thanks to its first and second detection modules; the detection unit adapts the routing of the first signal as a function of the activity of the first and second modules thanks to its control module. Thus, the voice assistance device according to the first aspect of the invention and the voice assistance method according to the second aspect of the invention only process the first signal without any constraint on the positioning of the microphone vis-à-vis a user or an external audio source.

Apart from the characteristics that have been mentioned in the preceding paragraphs, the voice assistance device according to the first aspect of the invention and the voice assistance method according to the second aspect of the invention may have one or more complementary characteristics among the following, considered individually or according to all technically possible combinations thereof.

The voice assistance device comprises an output interface configured to be activated as a function of the output signal generated by the analysis unit, the output interface preferably comprising an indicator light and/or a screen and/or a loud speaker. The output interface advantageously makes it possible to inform a user of the voice assistance device that has sent a request of the state of processing of this request.

The analysis unit preferentially interprets two types of requests in the first signal:
  a first type of request which is a question: in this case, the analysis unit generates a first type of output signal;
  a second type of request which is a command of an external equipment: in this case, the analysis unit generates a second type of output signal.

The output interface of the voice assistance device advantageously comprises:
  a screen and/or a loud speaker configured to be activated by an output signal of the first type;
  an indicator light configured to be activated by an output signal of the second type.

Thus, the output interface advantageously makes it possible to inform a user having sent a request, in a suitable manner as a function of the type of request.

According to a preferential embodiment:
  the first module activates a first logic event when it detects the wake word in the first signal;
  the second module activates a second logic event when it detects the wake word in the second signal;
  the control module has:
    a first logic state in which it does not route the first signal to the analysis unit, and
    a second logic state in which it routes the first signal to the analysis unit;
  the control module is by default in its first logic state, and
  the control module switches over to its second logic state when the first logic event is activated without the second logic event being activated.

This preferential embodiment advantageously makes it possible to only route the first signal to the analysis unit when a positive condition is achieved, namely: the first logic event is activated and the second logic event is not activated. The robustness of the device is thus favoured, while guaranteeing that the first signal will not be routed to the analysis unit by mistake.

According to the preferential embodiment, each second logic event advantageously remains activated for a predefined time delay preferentially comprised between 0.1 second and 1 second. Thus, a time delay is taken into account which can occur between a detection of an occurrence of the wake word in the second signal by the second module, and a detection of this same occurrence of the wake word in the first signal by the first module, due for example to:
  a transmission time of the second signal within the external audio source before actual broadcasting by the external audio source of an acoustic wave from the second signal;
  a propagation time of the acoustic wave between the external audio source and the microphone;
  a processing time of the acoustic wave by the microphone then of the first signal by the first detection module.

In the case where an occurrence of the wake word originates from an external audio source before being captured by the microphone, it is allowed that the activation of the second logic event for this occurrence of the wake word lasts up to the activation of the first logic event for this same occurrence of the wake word. According to the preferential embodiment, the control module having switched over to its second logic state switches back to its first logic state:
  on command of the analysis unit at the end of processing of the first signal, or
  automatically after a predefined time delay preferentially comprised between 0.5 second and 5 seconds, more preferentially comprised between 0.5 second and 3 seconds.

A third aspect of the invention relates to a digital television decoder comprising a voice assistance device according to the first aspect of the invention.

A fourth aspect of the invention relates to a computer programme product comprising instructions which, when the programme is executed by a computer, lead said computer to implement the steps of the voice assistance method according to the second aspect of the invention.

A fifth aspect of the invention relates to a computer readable recording support, on which is recorded the computer programme product according to the fourth aspect of the invention.

The invention and the applications thereof will be better understood on reading the description that follows and by examining the figures that accompany it.

BRIEF DESCRIPTION OF THE FIGURES

The figures are presented for indicative purposes and in no way limit the invention.

DETAILED DESCRIPTION OF AT LEAST ONE EMBODIMENT OF THE INVENTION

Unless stated otherwise, a same element appearing in the different figures has a single reference.

Figure 1:
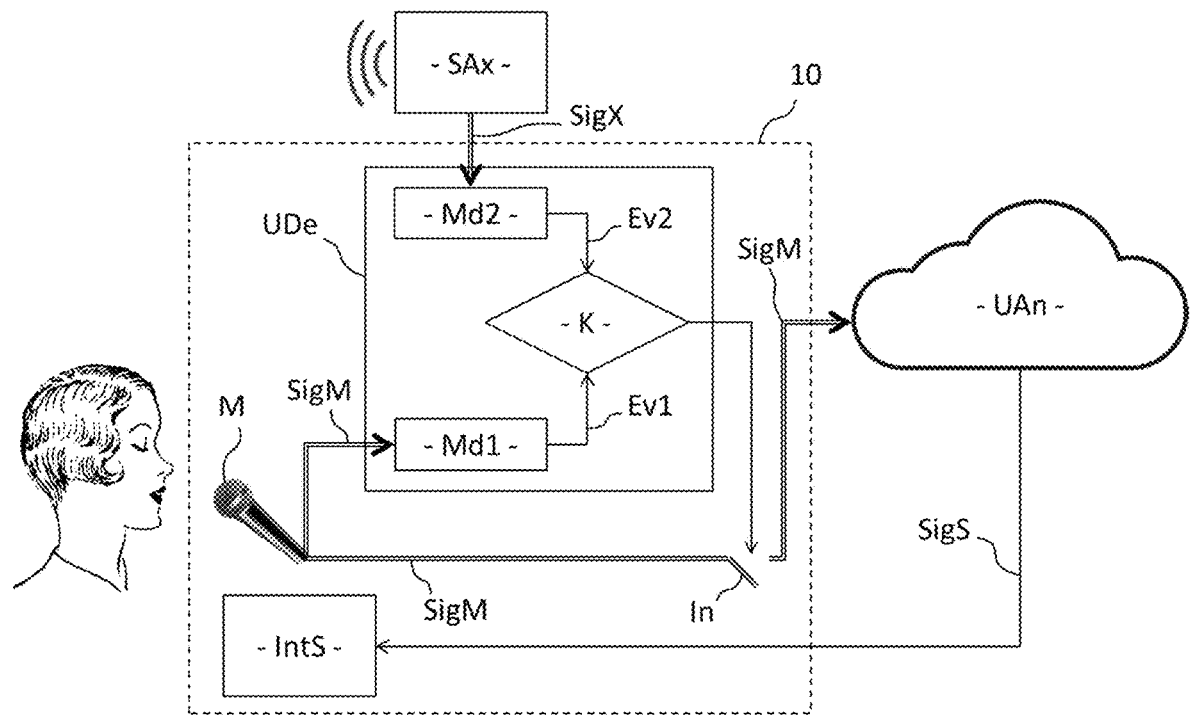
FIG. 1 shows a schematic representation of a voice assistance device according to the first aspect of the invention.

FIG. 1 schematically represents a voice assistance device 100 according to the first aspect of the invention. The voice assistance device 100 comprises:
  a microphone M and
  a unit for detecting UDe a wake word.

Preferentially, the voice assistance device 100 also comprises an output interface IntS. The output interface IntS preferentially comprises:
  an indicator light and/or
  a screen and/or
  a loud speaker.

The microphone M is configured to capture a sound environment in the form of a first signal SigM. The microphone M may be analogue, in which case it produces a first analogue signal SigM, or digital, in which case it produces a first digital signal SigM. If the microphone M is analogue, the voice assistance device 100 preferentially further comprises an analogue-digital converter arranged between the analogue microphone M and the detection unit UDe so as to convert the first analogue signal SigM into a first digital signal SigM.

The detection unit UDe comprises:
a first module Md1,
a second module Md2, and
a control module K.

The first module Md1 is configured to receive from the microphone M the first signal SigM, preferentially digital, and to detect a wake word in said first signal SigM. According to a preferential embodiment, the first module Md1 activates a first logic event Ev1 when it detects the wake word.

The second module Md2 is configured to receive from at least one external audio source SAx a second signal SigX, preferentially digital, and to detect the wake word in said second signal SigX. According to the preferential embodiment, the second module Md2 activates a second logic event Ev2 when it detects the wake word. FIG. 1 represents a single external audio source SAx but the second module Md2 may advantageously receive a plurality of second signals SigX from a plurality of external audio sources SAx. Examples of external audio sources SAx are: a television, a radio, a telephone, a personal computer. Each external audio source SAx is preferentially a digital equipment; in the opposite case, the voice assistance device 100 preferentially further comprises an analogue-digital converter arranged between the item(s) of analogue equipment and the detection unit UDe so as to convert each second analogue signal SigX into a second digital signal SigX.

The control module K is configured to route the first signal SigM to an analysis unit UAn when the wake word is detected only by the first module Md1. According to the preferential embodiment, the control module K has:
a first logic state in which it does not route the first signal SigM to the analysis unit UAn, and
a second logic state in which it routes the first signal SigM to the analysis unit UAn.

Still according to the preferential embodiment, the control module K is by default in its first logic state and switches over to its second logic state when the first logic event Ev1 is activated without the second logic event Ev2 being activated. In particular, FIG. 1 schematically shows the routing function commanded by the control module K by means of a switch In:
when the control module K is in its first logic state, it maintains the switch In open in order not to route the first signal SigM to the analysis unit UAn;
when the control module K is in its second logic state, it closes the switch In in order to route the first signal SigM to the analysis unit UAn.

The first signal SigM and the second signal SigX are audio signals represented by double arrows in FIG. 1. The first logic event Ev1, the second logic event Ev2 and the command signal at the output of the control module K are logic signals represented by single arrows in FIG. 1.

The analysis unit UAn is generally hosted in a computer infrastructure, comprising for example one or more servers, accessible remotely, also called "computing cloud" or simply "cloud". The analysis unit UAn is thus generally not physically located at the same place as the voice assistance device 100. On reception of the first signal SigM, the analysis unit UAn processes it in order to generate a suitable output signal SigS. The analysis unit UAn typically implements an NLU (natural language understanding) technique in order to process each first signal SigM that it receives.

A user may typically transmit two types of requests:
a first type of request which is a question, a request for information;
a second type of request which is a command of an external equipment.

The output signal SigS generated by the analysis unit UAn is advantageously adapted to the type of request interpreted by the analysis unit UAn and the output interface IntS is in its turn advantageously adapted to the output signal SigS.

The external equipment is for example home automation equipment such as a thermostat, a lighting, a rolling shutter: the command is then for example an adjustment of the temperature or luminosity (to switch on or switch off a lamp, to open or close a rolling shutter). The external equipment may also be a smartphone in order to command making a telephone call, sending a message or adding an event to a personal agenda, etc. Generally speaking, any item of equipment suited to being connected with its environment, that is to say to communicate with its environment, may be commanded by the output signal SigS of the analysis unit UAn.

If the analysis unit UAn interprets the first signal SigM received as being a request of the first type, the analysis unit UAn preferably generates a first type of output signal SigS which displays the information required on the screen of the output interface IntS and/or broadcasts the information required via the loud speaker of the output interface IntS. If the analysis unit UAn interprets the first signal received as being a request of the second type, the analysis unit UAn preferably generates a second type of output signal SigS which commands the desired external equipment and activates the indicator light of the output interface IntS.

The detection unit UDe may notably be integrated within a digital television decoder. The microphone M may be integrated with the detection unit UDe, thus if need be within a digital television decoder. Alternatively, the microphone M and the detection unit UDe may form two physically distinct parts being able to be displaced with respect to each other. The output interface IntS is preferentially integrated with the microphone M, within a same physical block.

Figure 2:
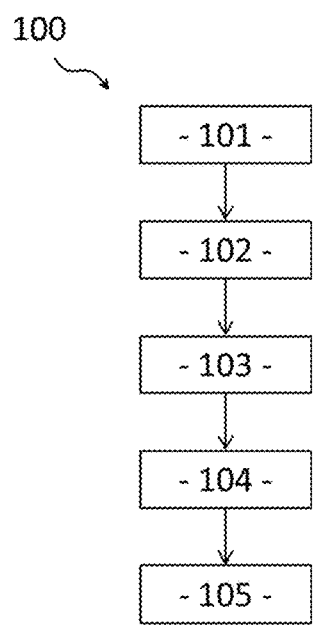
FIG. 2 shows a schematic diagram of the steps of a voice assistance method according to the second aspect of the invention.

FIG. 2 shows a schematic diagram of the steps of a voice assistance method 100 according to the second aspect of the invention:
according to a first step 101, the microphone M captures a sound environment in the form of the first signal SigM;
according to a second step 102, the microphone M transmits the first signal SigM to the detection unit UDe;
according to a third step 103, the control module K of the detection unit UDe routes the first signal SigM to the analysis unit UAn when the wake word is detected only by the first module Md1 of the detection unit UDe;
according to a fourth step 104, the analysis unit UAn processes the first signal SigM transmitted by the control module K and generates an output signal SigS.

The invention claimed is:
1. A voice assistance device comprising:
a microphone and
a detection unit for detecting a wake word,
the microphone being configured to capture a sound environment in the form of a first signal and to transmit the first signal to the detection unit; the detection unit being configured to route, in the event of detection of the wake word in the first signal, said first signal to an analysis unit; said analysis unit being configured to process the first signal and to generate an output signal;
wherein the detection unit comprises:
a first module configured to receive from the microphone the first signal and to detect the wake word in said first signal, the first module activating a first logic event when the first module detects the wake word in the first signal,
a second module configured to receive from at least one external audio source a second signal different from said first signal and to detect the wake word in said second signal, an acoustic wave signal being broadcasted by the at least one external audio source from the second signal, the second module activating a second logic event when the second module detects the wake work in the second signal, and
a control module in communication with both the first module and the second module so as to receive both the first logic event activated by the first module when the wake word is detected by the first module and the second logic event activated by the second module when the wake word is detected by the second module, the control module being configured to, after the first module has received the first signal, route the first signal to the analysis unit when the wake word is detected only by the first module of the detection unit so that the control module does not route the first signal to the analysis unit, after the first module has received the first signal, when the control module receives both the first logic event activated by the first module and the second logic event activated by the second module.

2. The voice assistance device according to claim 1, wherein:
the control module has:
a first logic state in which the control module does not route the first signal to the analysis unit, and a second logic state in which the control module routes the first signal to the analysis unit,
the control module being by default in its first logic state;
the control module switches over to its second logic state when the first logic event is activated without the second logic event being activated.

3. The voice assistance device according to claim 2, wherein each second logic event remains activated for a predefined time delay comprised between 0.1 second and 1 second.

4. The voice assistance device according to claim 2, wherein the control module having switched to its second logic state switches back to its first logic state:
on command of the analysis unit at the end of processing of the first signal, or
automatically after a predefined time delay comprised between 0.5 second and 5 seconds.

5. The voice assistance device according to claim 1, further comprising an output interface configured to be activated as a function of the output signal generated by the analysis unit, the output interface comprising an indicator light and/or a screen and/or a loud speaker.

6. A digital television decoder comprising a voice assistance device according to claim 1.

7. A voice assistance method comprising:
capturing by a microphone a sound environment in the form of a first signal and transmitting by the microphone the first signal to a detection unit comprising:
a first module for detecting a wake word in the first signal, the first module activating a first logic event when the first module detects the wake word in the first signal,
a second module for detecting the wake word in a second signal transmitted by at least one external audio source, the second signal different from said first signal, an acoustic wave signal being broadcasted by the at least one external audio source from the second signal, the second module activating a second logic event when the second module detects the wake work in the second signal, and
a control module in communication with both the first module and the second module so as to receive both the first logic event activated by the first module when the wake word is detected by the first module and the second logic event activated by the second module when the wake word is detected by the second module;
routing, after the first module has received the first signal, by the control module the first signal to an analysis unit when the wake word is detected only by the first module of the detection unit so that the control module does not route the first signal to the analysis unit, after the first module has received the first signal, when the control module receives both the first logic event activated by the first module and the second logic event activated by the second module;
processing by the analysis unit the first signal transmitted by the control module and generates an output signal.

8. A non-transitory recording support readable by a computer, on which is recorded a computer programme product comprising instructions which, when the programme is executed by the computer, lead said computer to implement the steps of the voice assistance method according to claim 7.

* * * * *